United States Patent
Kim

(10) Patent No.: US 7,027,108 B2
(45) Date of Patent: Apr. 11, 2006

(54) APPARATUS AND METHOD FOR AUTO CHANNEL SEARCHING OF VIDEO DISPLAY APPARATUS

(75) Inventor: In Hoon Kim, Daeku (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/419,109

(22) Filed: Apr. 21, 2003

(65) Prior Publication Data

US 2003/0179320 A1    Sep. 25, 2003

Related U.S. Application Data

(63) Continuation of application No. 09/534,090, filed on Mar. 23, 2000, now Pat. No. 6,600,522.

(30) Foreign Application Priority Data

Mar. 26, 1999 (KR) .............................. 1999-10551

(51) Int. Cl.
    H04N 5/445    (2006.01)
(52) U.S. Cl. .................................... 348/732
(58) Field of Classification Search ............... 348/563, 348/564, 565, 732; 725/56, 57, 59
    See application file for complete search history.

(56) References Cited

U.S. PATENT DOCUMENTS 4,737,993 A    4/1988    DeVilbiss .................... 455/180

5,103,314 A *  4/1992    Keenan ........................ 725/59

(Continued)

FOREIGN PATENT DOCUMENTS

GB    2 245 786 A    1/1992

(Continued)

*Primary Examiner*—Paulos M. Natnael
(74) *Attorney, Agent, or Firm*—Fleshner & Kim, LLP

(57) ABSTRACT

The present invention relates to an auto channel search apparatus for a TV and a method thereof capable of easily recognizing a broadcast channel of a user. The above-described method includes a step for displaying a channel list in accordance with a channel search instruction of a user and performing a search in the sequence of the number stored in the channel list, and a step for performing an indication operation for separating a channel number which does not have a broadcast signal with respect to a channel number which has a broadcast signal in the channel list. In addition, there are further provided a step for displaying a channel list and channel search screen in which a certain indication is performed at a channel having a broadcast signal by an auto channel search when a user inputs a channel selection memu key after an auto channel search is completed in accordance with a channel search instruction of a user, and a step for displaying a user's last selected channel on a previous screen based on the channel list and search screen.

22 Claims, 7 Drawing Sheets

U.S. PATENT DOCUMENTS

| | | | |
|---|---|---|---|
| 5,182,646 A * | 1/1993 | Keenan | 348/732 |
| 5,253,067 A * | 10/1993 | Chaney et al. | 348/570 |
| 5,299,010 A | 3/1994 | Nakazawa et al. | 348/731 |
| 5,410,361 A | 4/1995 | Lee | 348/570 |
| 5,483,684 A | 1/1996 | Ono et al. | 455/161.2 |
| 5,528,304 A * | 6/1996 | Cherrick et al. | 348/565 |
| 5,585,866 A * | 12/1996 | Miller et al. | 725/43 |
| 5,592,551 A * | 1/1997 | Lett et al. | 380/211 |
| 5,757,441 A | 5/1998 | Lee et al. | 348/731 |
| 5,786,869 A | 7/1998 | Back et al. | 348/565 |
| 5,956,097 A | 9/1999 | Nguyen et al. | 348/731 |
| 5,978,043 A * | 11/1999 | Blonstein et al. | 348/569 |
| 6,175,362 B1 * | 1/2001 | Harms et al. | 345/721 |
| 6,271,893 B1 * | 8/2001 | Kawaguchi et al. | 348/725 |
| 6,369,855 B1 | 4/2002 | Chauvel et al. | 348/423.1 |
| 6,426,779 B1 * | 7/2002 | Noguchi et al. | 348/569 |
| 6,493,876 B1 * | 12/2002 | DeFreese et al. | 725/100 |
| 6,577,350 B1 * | 6/2003 | Proehl et al. | 348/564 |
| 6,766,526 B1 * | 7/2004 | Ellis | 725/57 |

FOREIGN PATENT DOCUMENTS

| | | |
|---|---|---|
| GB | 2 264 409 A | 8/1993 |
| GB | 2 323 489 A | 9/1998 |
| WO | WO 93/12611 | 6/1993 |
| WO | WO 99/04559 | 1/1999 |

\* cited by examiner

FIG. 5A

|  | 11 | 21 | 31 | 41 | 51 | 61 |  |
| --- | --- | --- | --- | --- | --- | --- | --- |
| YELLOW—2 | 12 | 22 | 32 | 42 | 52 | 62 |  |
| 3 | 13 | 23 | 33 | 43 | 53 | 63 | BLUE:DTV-RF |
| 4 | 14 | 24 | 34 | 44 | 54 | 64 | RED :NTSC/CABLE |
| 5 | 15 | 25 | 35 | 45 | 55 | 65 | ANALOG SEARCHING |
| 6 | 16 | 26 | 36 | 46 | 56 | 66 | 2 |
| 7 | 17 | 27 | 37 | 47 | 57 | 67 |  |
| 8 | 18 | 28 | 38 | 48 | 58 | 68 |  |
| 9 | 19 | 29 | 39 | 49 | 59 | 69 |  |
| 10 | 20 | 30 | 40 | 50 | 60 |  |  |

FIG. 5B

BLUE

|  | 11 | 21 | 31 | 41 | 51 | 61 |  |
| --- | --- | --- | --- | --- | --- | --- | --- |
| RED—2 | 12 | 22 | 32 | 42 | 52 | 62 |  |
| 3 | 13 | 23 | 33 | 43 | 53 | 63 | BLUE:DTV-RF |
| 4 | 14 | 24 | 34 | 44 | 54 | 64 | RED :NTSC/CABLE |
| 5 | 15 | 25 | 35 | 45 | 55 | 65 | DIGITAL SEARCHING |
| 6 | 16 | 26 | 36 | 46 | 56 | 66 | 51  DGITAL 6-2 |
| 7 | 17 | 27 | 37 | 47 | 57 | 67 |  |
| 8 | 18 | 28 | 38 | 48 | 58 | 68 |  |
| 9 | 19 | 29 | 39 | 49 | 59 | 69 |  |
| 10 | 20 | 30 | 40 | 50 | 60 |  |  |

APPARATUS AND METHOD FOR AUTO CHANNEL SEARCHING OF VIDEO DISPLAY APPARATUS

This application is a continuation of U.S. patent application Ser. No. 09/534,090 filed Mar. 23, 2000, which claims priority to Korean Application No. 10551–1991 filed on Mar. 26, 1999, whose entire disclosures are incorporated herein by reference.

BACKGROUND OF THE INVENTION

1. Field of the Invention

The present invention relates to a video display apparatus, and in particular to an apparatus and method for an auto channel searching of a video display apparatus.

2. Description of the Background Art

Generally, an auto channel searching function is capable of judging a broadcast channel of a selected channel exists, memorizing the channel having a broadcast signal as a valid channel and being used when selecting a certain channel and is generally used when first purchasing a TV or reinstalling the TV.

For example, in the case of searching an auto channel with respect to an analog broadcast, public wave channels 2 through 69 and cable channels 1 through 125 are searched in the sequence of a channel number for thereby detecting a channel having a corresponding signal, and the detected channel is stored into a memory. In this state, when a user pushes a channel up/down key, the channel is changed to the channel sequence stored in the memory.

In the auto channel search method of the conventional TV, the presence of the broadcast signal are searched in the sequence of the channel number with respect to the whole channels, and then the channel having a broadcast signal is memorized for thereby implementing an auto channel search. As shown in FIG. 1, the proceeding degree of the auto channel search is displayed by the unit of % together with the currently searching channel number.

In the auto channel search method of the conventional TV, the proceeding degree is simply displayed. Namely, the existing channel types and corresponding broadcast service company name are not displayed, so that a user can not easily recognize a certain broadcast company name and whether a certain channel is available.

SUMMARY OF THE INVENTION

Accordingly, it is an object of the present invention to provide an auto channel searching apparatus for a TV and a method thereof which are capable of overcoming the problems encountered in the conventional art and easily recognizing a certain broadcast channel of a user.

To achieve the above object, there is provided an auto channel searching apparatus for a TV according to the present invention which includes a tuner unit for selecting an analog, digital or cable broadcast signal, a signal processing unit for performing a switching operation of an audio and video signal among the broadcast signals selected by the tuner unit and performing a video process of the broadcast signal, a CPT for reproducing a video signal outputted from the switching and signal process unit on a screen, an EEPROM for storing various program information and channel list-related information, a logo memory for storing a broadcast company-based logo video, a key input unit for inputting various operation keys, and a microcomputer for controlling each unit of a TV system so that a channel list information and each broadcast company-based logo information is read in accordance with an auto channel search instruction inputted by the key input unit from the EEPROM and the logo memory and displaying on a screen based on a video process.

To achieve the above object, there is provided an auto channel searching method for a TV according to the present invention which includes a step for displaying a channel list in accordance with a channel search instruction of a user and performing a search in the sequence of the number stored in the channel list, and a step for performing an indication operation for separating a channel number which does hot have a broadcast signal with respect to a channel number which has a broadcast signal in the channel list.

BRIEF DESCRIPTION OF THE DRAWINGS

The present invention will become better understood with reference to the accompanying drawings which are given only by way of illustration and thus are not limitative of the present invention, wherein:

FIGS. 5A and 5B are views illustrating an embodiment of an auto channel search screen for a TV according to the present invention.

DETAILED DESCRIPTION OF THE PREFERRED EMBODIMENTS

The auto channel search apparatus for a TV according to the present invention includes a tuner unit for selecting an analog, digital or cable broadcast signal, a switching and signal processing unit for performing a switching operation of an audio signal and a video signal among the broadcast signals selected by the tuner unit and performing a video process of the broadcast signal, a CPT for displaying a video signal from the switching and signal processing unit on a screen, an EEPROM for storing various program information and a channel list-related information, a logo memory for storing a logo image by the broadcast service company, a key input unit for inputting various operation instructions, and a microcomputer for controlling each unit of the system so that a channel list information and each broadcast-based logo information are read in accordance with an auto channel search memory inputted through the key input unit from the EEPROM and logo memory and displayed on the screen based on a video process.

The auto channel search method for a TV according to the present invention includes a step for displaying a channel list in accordance with an auto channel search instruction of a user and searching the channel list in the sequence of the channel number stored in the channel list, and a step for performing a display operation for separating a channel number which does not have a broadcast signal with respect to the channel number which has the broadcast signal in the channel list.

In addition, the auto channel search method for a TV according to the present invention includes a step for displaying a channel list and channel search screen in which a certain signal is displayed in the channel having a broadcast signal by an auto channel search when a user inputs a channel selection key such as an up/down key, and a step for displaying the last selected channel of the user on the screen based on the channel list and search screen.

Figure 1:
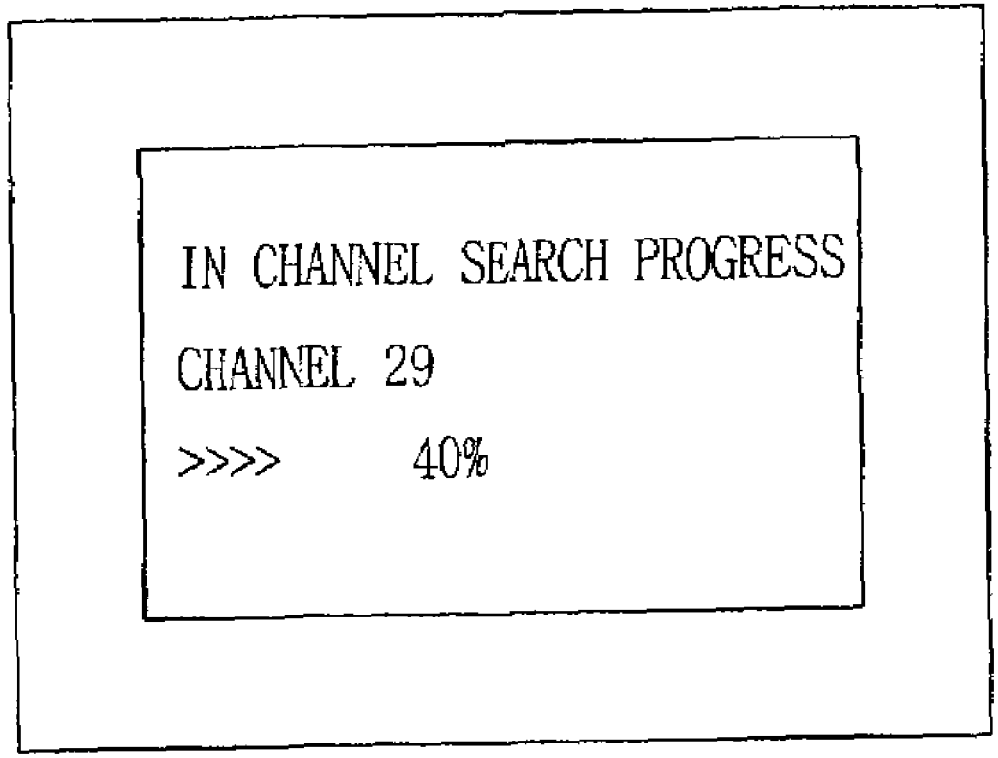
FIG. 1 is a view illustrating an auto channel search screen of a conventional TV.
Figure 2:
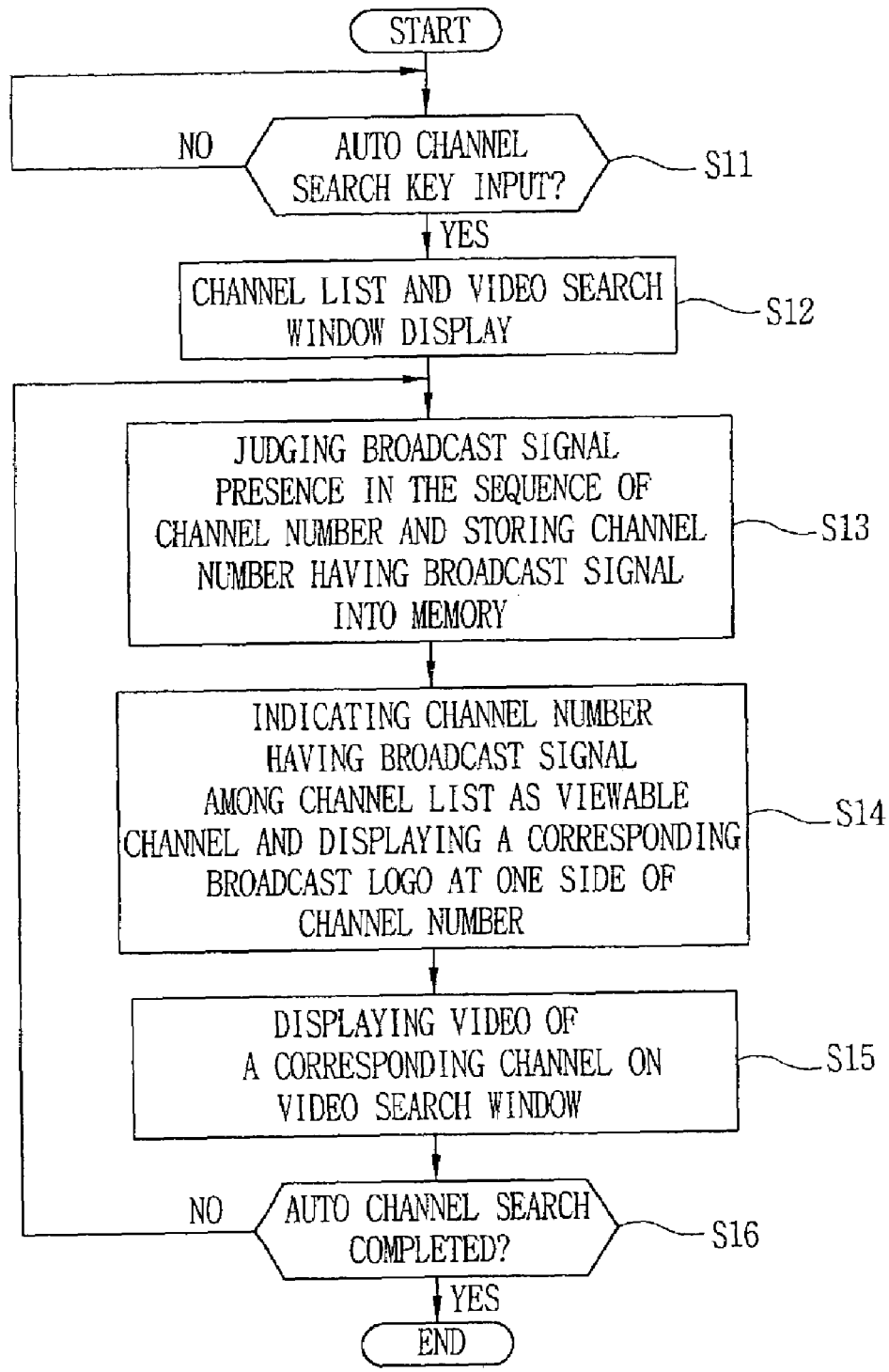
FIG. 2 is a flow chart for describing an auto channel search method of a TV according to the present invention.

In the present invention, as shown in FIG. 2, in Step S11, it is judged whether a user inputs an auto channel search key, and when the channel search key is inputted, a video search window is displayed for providing a user with a video of a channel for a channel list and search in Step S12.

In Step S13, it is judged whether a broadcast signal exists in a corresponding channel in the sequence of the channel numbers stored in the channel list, and the channel number having the broadcast signal is stored in the memory. In addition, the channel having the broadcast signal among the channel number in the channel list is indicated as a view available channel. Namely, in the case that the channel number is an analog channel, the channel is indicated by a red color, and in the case of the digital channel, the channel is indicated by a blue color, so that a user can easily recognize an available channel, namely, a view available channel having a broadcast signal, and the logo of a corresponding broadcast company is displayed at one side of the digital channel number in Step S14.

At this time, before the search is performed, the channel number stored in the channel list is indicated by a black color. When the search is performed, a corresponding channel number is indicated by a yellow color. In this state, the channel number having a broadcast signal is indicated by a red color, and the digital is indicated by a blue color. In addition, the logo of a corresponding broadcasting company is displayed at one side of the channel number having a broadcast signal, so that a user can easily recognize whether the currently proceeding channel is an analog broadcast or a digital broadcast, and it is possible to easily recognize the name of the broadcasting company.

In addition, in a method, the logo of the broadcast company may be transmitted from the broadcast company together with the broadcast signal, and then the video data is processed for implementing the logo, and the logo is displayed at one side of the channel number. In another method, the logo of a corresponding broadcast company may be stored in an image file format and is matched with a corresponding channel for thereby displaying the logo.

In particular, in the case of the digital channel, a certain video data is transmitted together with the broadcast signal for implementing the logo of the broadcast company based on an easier transmission of various information including the broadcast signal.

In addition, in the case of the analog channel, a corresponding channel-based broadcast company name or logo is transmitted from the broadcast company together with a broadcast signal. The channel-based broadcast company name or logo is stored into the memory in the TV system and is matched with a corresponding channel for thereby displaying the logo, so that it is possible to implement the same operation as the digital channel.

The video of the channel of the current search is displayed on the video search window in Step S15.

The channel search is performed with respect to the entire channels, namely, the analog channel and digital channel for thereby completing the auto channel search in Step S16.

The auto channel search apparatus for a TV and a method thereof according to the present invention will be explained with reference to the accompanying drawings.

Figure 3:
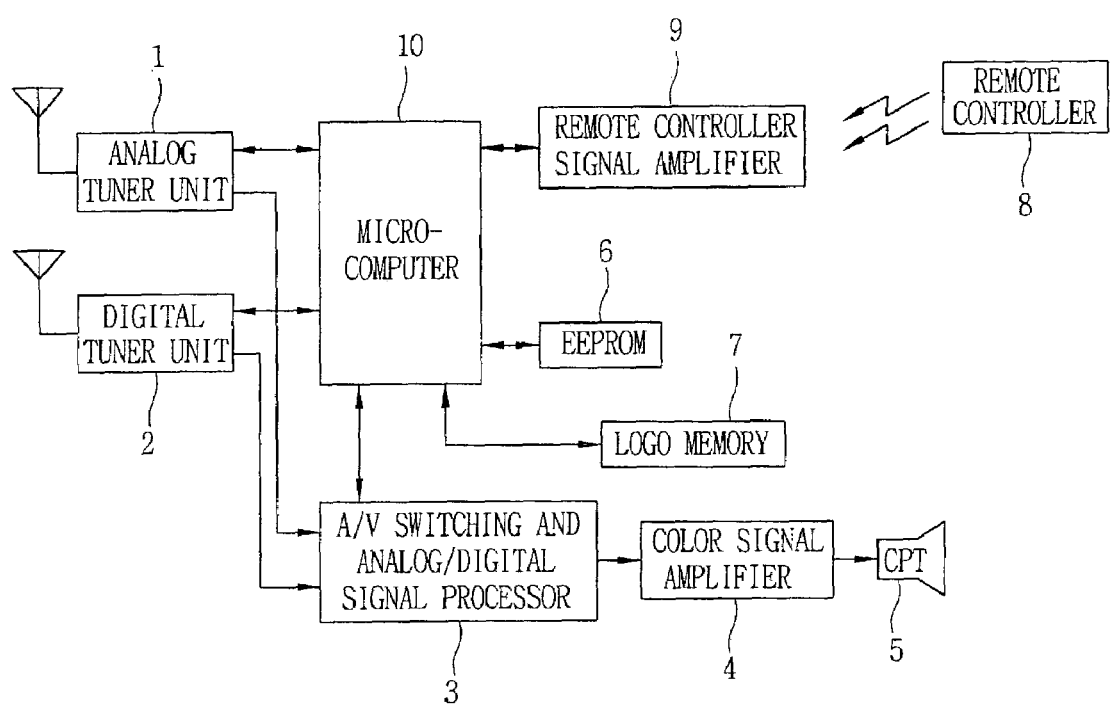
FIG. 3 is a block diagram of an auto channel search apparatus for a TV according to the present invention.
Figure 4A:
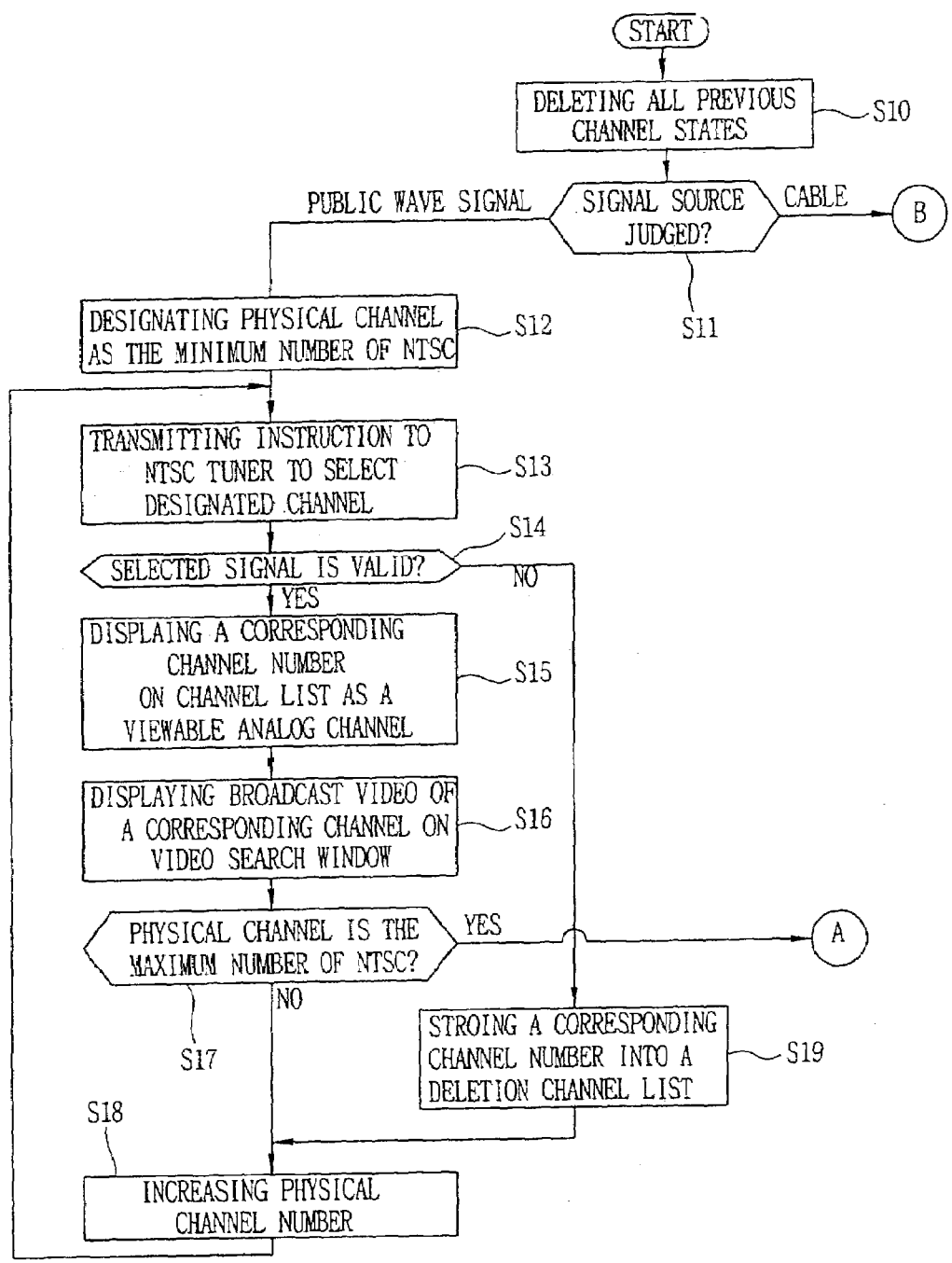
FIGS. 4A through 4C are a flow chart of an auto channel search method for a TV according to the present invention.
Figure 4B:
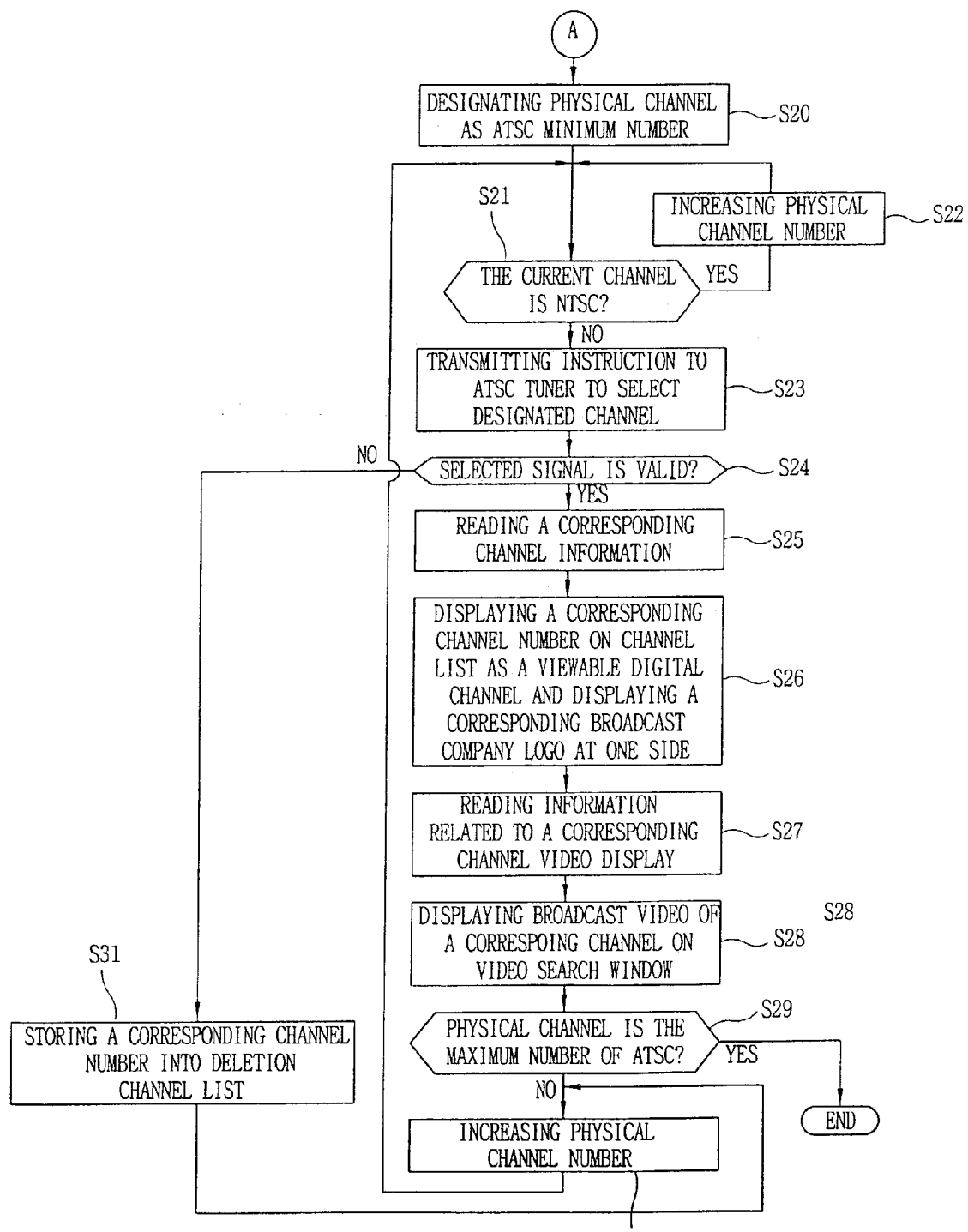
Figure 4C:
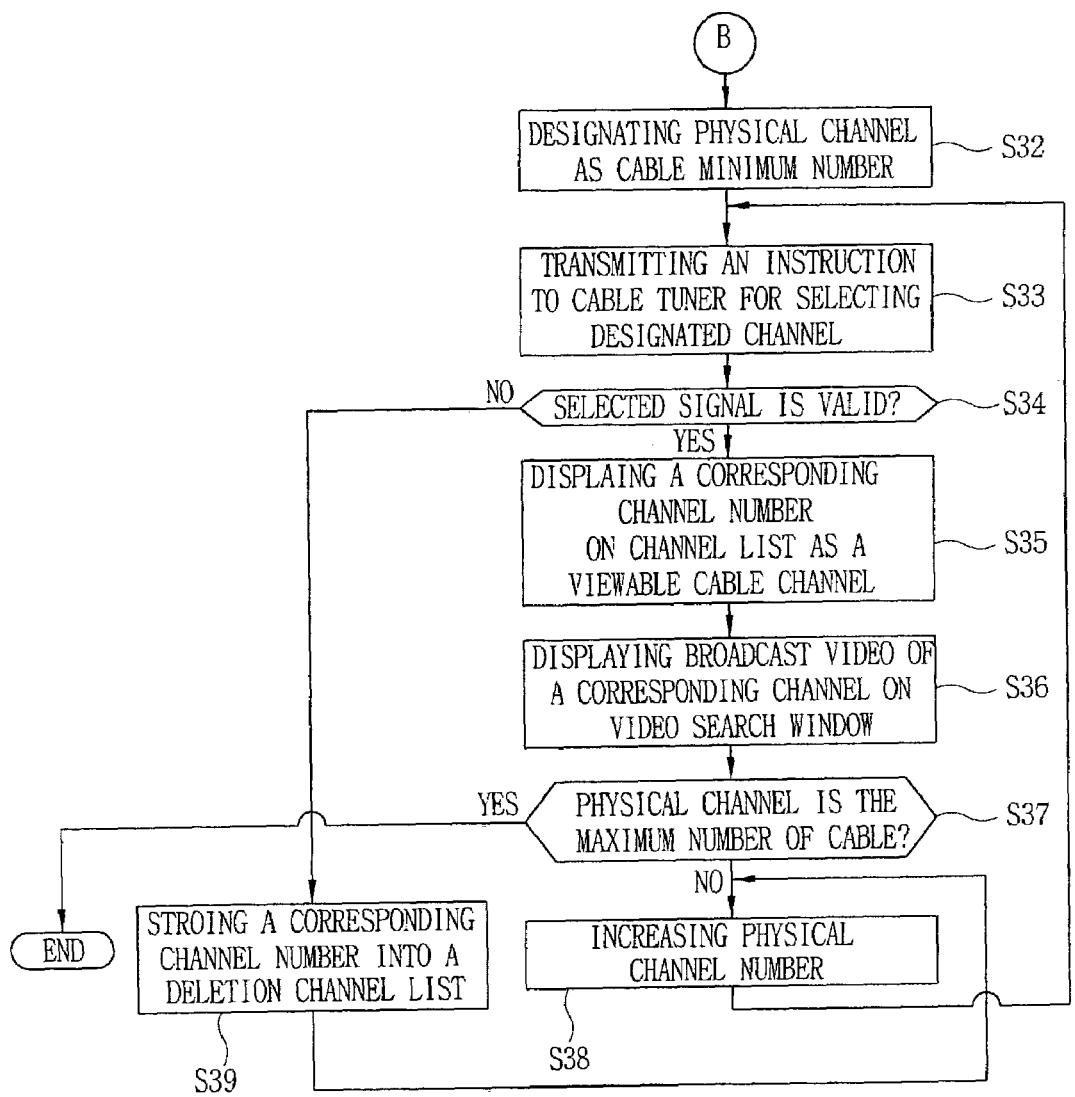

FIG. 3 is a block diagram of an auto channel search apparatus for a TV according to the present invention, FIGS. 4A through 4C are a flow chart of an auto channel search method for a TV according to the present invention, and FIGS. 5A and 5B are views illustrating an embodiment of an auto channel search screen for a TV according to the present invention.

As shown in FIG. 3, the auto channel search apparatus for a TV according to the present invention includes an analog tuner 1 for selecting an analog broadcast signal, a digital tuner 2 for selecting a digital broadcast signal, an A/V switching and analog/digital signal processing unit 3 for performing a switching operation of an audio signal and a video signal among the broadcast signals selected by the analog tuner 1 and the digital tuner 2 and a video process of the analog/digital broadcast signal, a color signal amplifying unit 4 for amplifying the color signal outputted from the A/V switching and analog/digital signal processing unit 3, a CPT 5 for reproducing a video, an EEPROM 6 for storing various program information and channel list-related information, a logo memory 7 for storing the logo images of the broadcast companies, a remote controller 8 for inputting various operation instructions, a remote controller signal amplifier 9 for amplifying a remote controller signal, and a microcomputer 10 for controlling each unit of the TV system so that a channel list information and each broadcast company-based logo information are read from the EEPROM 6 and the logo memory 7 in accordance with an auto channel search instruction inputted by the remote controller 8.

An embodiment of the auto channel search method based on an auto channel search apparatus for a TV according to the present invention will be explained.

As shown in FIGS. 4A–4C, the auto channel search method for a TV according to the present invention will be explained. When a user inputs an auto channel search key using the remote controller 8, the microcomputer 10 recognizes the inputted key. As shown in FIG. 5A, a channel list and a video search window are displayed at one side for a video search of a corresponding channel, and the current channel state is deleted in Step S10, and a signal input source, namely, a public wave signal or a cable signal is judged in Step S11.

As a result of the judgement of Step S11, the broadcast signal is a public wave signal, the search is performed with respect to the whole channels of the analog and digital signals. First, the search is performed with respect to the analog channel(NTSC), and a physical channel number is designated as a minimum number of the analog channel in Step S12.

A channel selection instruction is transmitted to the analog tuner 1 so that the designated channel is selected in Step S13. Thereafter, it is judged whether the broadcast signal of the selected channel is available, namely, whether the signal can be viewed in Step S14. If available, a corresponding channel number is changed to the red color, so that the corresponding channel number is indicated as a viewable analog channel in Step S15.

As a result of the judgement S14, if the corresponding channel is not available, namely, there is not a broadcast signal, a corresponding channel number is stored in the deletion channel list of the EEPROM 6 in Step S19. In addition, a broadcast video of a corresponding channel is displayed on the video search window at one side of the channel list in Step S16. Thereafter, the physical channel is judged to be the maximum number of the analog channel in Step S17. If not the maximum number, the channel number is increased in Step S18, and a corresponding channel is selected by the analog tuner 1.

In addition, as a result of the judgement of Step S17, if the physical channel is the maximum number of the analog channel, it means that the search with respect to the analog channel is completed. Therefore, the current physical channel is designated as the minimum number of the digital channel(ATSC) for performing a search with respect to the digital channel in Step S20.

The broadcast channel system will be explained. Since the analog and digital signals are not divided into a certain sections but are mixed each other, so that when increasing the channel number for the digital channel search, the analog channel is searched, so that the total search time is increased. Therefore, in order to prevent the above-described problems, it is judged whether the current channel is the analog channel in Step S21. As a result of the judgement, if the current channel is the analog channel, the availability of the selected signal is not checked, and the channel number is increased in Step S22.

As a result of the judgement of Step S21, if the current channel is the digital channel, a channel selection instruction is transmitted to the digital tuner 2 to select the designated channel in Step S23. Thereafter, it is judged whether the broadcast signal of the selected channel is available in Step S24. If available, a corresponding channel-related information, namely, a corresponding channel broadcast company name, a broadcast company logo, etc. is read in Step S25. In addition, the broadcast company logo is stored in the logo memory 7. At this time, the availability of a corresponding channel is judged in accordance with the presence state of the synchronous signal.

In addition, the corresponding channel number is changed to the blue color for thereby indicating as a viewable digital channel, and a corresponding broadcast company logo stored in the logo memory 7 is read in Step S25 and is video-processed and is displayed at one side of a corresponding channel number in Step S26. A display-related information, namely, a packet ID(PID) is read for displaying the video of a corresponding channel on the video search window in Step S27.

In addition, a transport packet is decoded using the packet ID, and a video information of a corresponding channel is video-processed and is displayed on the video search window in Step S28. Thereafter, it is judged whether the current physical channel number is the maximum number of the digital channel in Step S29. As a result of the judgement, if the current physical channel number is the maximum number, the routine is completed. If the current physical channel number is not the maximum number, the physical channel number is increased in Step S30. The Steps S21 through S29 are performed up to the maximum number. In addition, as a result of the judgement of Step S24, if a corresponding channel is not available, namely, if the broadcast signal is not present, a corresponding channel number is stored into the deletion channel list of the internal memory like the analog channel auto search in Step S31.

As a result of the signal input source judgement of Step S11, if the broadcast is the cable broadcast, the physical channel number is designated based on the minimum number of the cable channel in Step S32. In addition, a channel selection instruction is transmitted to the cable tuner(not shown) so that the designated channel is selected in Step S33. Thereafter, it is judged whether the selected broadcast signal is valid in Step S34. If valid, a corresponding channel number is changed to the green color for thereby indicating a viewable cable channel in Step S35.

As a result of the judgement of Step S14, if the corresponding channel is invalid, namely, if the broadcast signal is not present, a corresponding channel number is stored into the deletion channel list of the internal memory like the auto search of the analog and digital channel in Step S39. In addition, the broadcast video of a corresponding channel is displayed on the video search window at one side of the channel list in Step S36. Thereafter, it is judged whether the physical channel is the maximum number of the cable channel in Step S37. If the physical channel is not the maximum number, the channel number is increased in Step S38. In addition, the steps S33 through S37 are performed up to the maximum number for thereby completing the search with respect to the cable channel.

In the auto channel search method of a TV according to the present invention, the process that the channel search is performed is displayed based on the color change of the channel number, and the channel having the broadcast signal is separated from other channels using a color change and the logo of a corresponding broadcast company for thereby implementing an easier channel recognition of the user. The video of the channel in which the search is proceeded together with the channel list is displayed for thereby increasing the product satisfaction by increasing a visual desire of the user.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An auto channel search method in a television, comprising:
   receiving an indication of a start of an auto channel search;
   performing the auto channel search on a first channel of a channel list in response to receiving the indication of the channel search and thereafter automatically performing the auto channel search on each of the remaining channels of the channel list;
   locating viewable channels during the auto channel search;
   displaying a list of the viewable channels during the auto channel search, the list displaying viewable channels from a cable source in a first color and displaying viewable channels from a broadcast source in a second color.

2. An auto channel search method in a television, comprising:
   receiving an indication of a start of an auto channel search;
   performing the auto channel search on a first channel of a channel list in response to receiving the indication of the channel search and thereafter automatically performing the auto channel search on each of the remaining channels of the channel list;
   locating viewable channels during the auto channel search;
   displaying a list of the viewable channels during the auto channel search, the list displaying viewable channels from an analog media source in a first color and displaying viewable channels from a digital media source in a second color.

3. The method of claim 1, further comprising:
displaying a logo indicative of a channel broadcasting company associated with at least one of the channels in the displayed list.

4. The method of claim 1, further comprising:
displaying a logo of a broadcast company at one side of at least one channel number in the channel list.

5. The method of claim 3, further comprising:
receiving information indicative of the logo in a broadcast signal corresponding to said at least one channel number.

6. The method of claim 3, further comprising:
retrieving from a memory information indicative of the logo corresponding to said at least one channel number.

7. A television system, comprising:
a device to receive an indication of a start of an auto channel search;
a tuner; and
a controller which locates viewable channels received through said tuner during the auto channel search, the controller performing the auto channel search on a first channel of a channel list in response to receiving the indication of the start of the auto channel search and thereafter automatically performing the auto channel search on each of the remaining channels of the channel list, and the controller to control a displaying of a list of the viewable channels during the auto channel search, wherein the controller automatically displays viewable channels in the list from a cable source in a first color and displays viewable channels in the list from a broadcast source in a second color.

8. A television system, comprising:
a device to receive an indication of a start of an auto channel search;
a tuner; and
a controller which locates viewable channels received through the tuner during the auto channel search, the controller performing the auto channel search on a first channel of a channel list in response to receiving the indication of the start of the auto channel search and thereafter automatically performing the auto channel search on each of the remaining channels of the channel list, and the controller to control a displaying of a list of the viewable channels during the auto channel search, wherein the controller automatically displays viewable channels in the list from an analog media source in a first color and displays viewable channels in the list from a digital media source in a second color.

9. The system of claim 7, wherein the controller displays a logo indicative of a channel broadcasting company associated with at least one of the channels in the displayed list.

10. The system of claim 9, wherein information indicative of the displayed logo is received in a broadcast signal.

11. The system of claim 9, wherein information indicative of the displayed logo is retrieved from a memory.

12. The system of claim 7, wherein the controller displays a logo of a broadcast company at one side of at least one channel number in the channel list.

13. The system of claim 7, wherein the tuner includes an analog tuner unit and a digital tuner unit.

14. The system of claim 8, wherein the controller displays a logo indicative of a channel broadcasting company associated with at least one of the channels in the displayed list.

15. The system of claim 14, wherein information indicative of the displayed logo is received in a broadcast signal.

16. The system of claim 14, wherein information indicative of the displayed logo is retrieved from a memory.

17. The system of claim 8, wherein the controller displays a logo of a broadcast company at one side of at least one channel number in the channel list.

18. The system of claim 8, wherein the tuner includes an analog tuner unit and a digital tuner unit.

19. The method of claim 2, further comprising:
displaying a logo indicative of a channel broadcasting company associated with at least one of the channels in the displayed list.

20. The method of claim 2, further comprising:
displaying a logo of a broadcast company at one side of at least one channel number in the channel list.

21. The method of claim 19, further comprising:
receiving information indicative of the logo in a broadcast signal corresponding to said at least one channel number.

22. The method of claim 19, further comprising:
retrieving from a memory information indicative of the logo corresponding to said at least one channel number.

* * * * *